Patented June 24, 1941

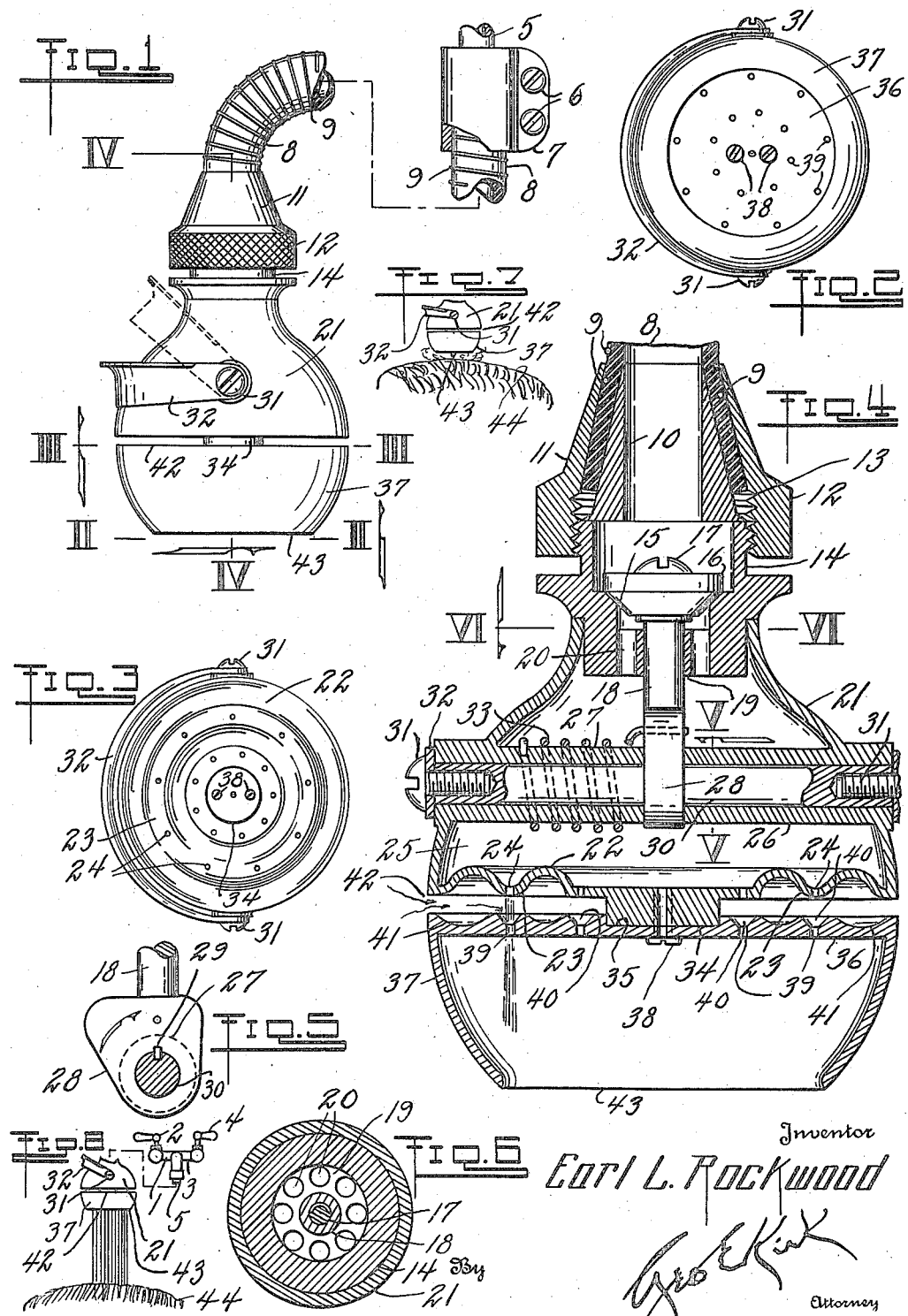

2,247,310

UNITED STATES PATENT OFFICE 2,247,310

SHAMPOO APPARATUS

Earl L. Rockwood, Toledo, Ohio, assignor to Gifford D. Davis, South Orange, N. J.

Application June 29, 1938, Serial No. 216,529

7 Claims. (Cl. 299—141)

This invention relates to controlled aerated liquid delivery.

This invention has utility when incorporated in directionable, multi-jet concentration for massage-like invigorating and cleansing impact as on the scalp of one receiving a shampoo.

Referring to the drawing:

Fig. 1 is a side elevation, with parts broken away, of an embodiment of this liquid and air delivery apparatus or hand tool;

Fig. 2 is a view from the line II—II, Fig. 1, showing the discharge or outlet portion of the tool;

Fig. 3 is a section on the line III—III, Fig. 1, showing the multi-jet delivery from the liquid supply as at the region for entraining the air;

Fig. 4 is a section approximating the line IV—IV, Fig. 1, showing the bail operated check valve, with indicated directions of liquid and air flow for delivery;

Fig. 5 is a section on the line V—V, Fig. 4, showing the cam for unseating the check valve;

Fig. 6 is a view on the line VI—VI, Fig. 4, showing the supporting spider for guiding the check valve;

Fig. 7 is a fragmentary view on a reduced scale, showing the tool in partially open position as to the bail, thereby to effect delivery of the air dampening or moistening cloud or fog; and Fig. 8 is a fragmentary view showing the more open position as to the bail for effecting high pressure impacting jet flow into the scalp as a massage-like invigorating factor to promote cleansing.

Hot water line 1 is shown as provided with valve 2 (Fig. 8). Adjacent thereto is cold water supply line 3 with valve 4 coacting for controlling the mixing temperature of the two water supplies in passing to common delivery duct 5, to which may be connected by bolts 6 clamp collar 7 (Fig. 1) embracing terminus of rubber tube 8 as enveloped by wire helix 9. This helix 9, which is assembled about the distended tube 8, upon release of the tube provides a protective armor effective to hold the duct even under pressure against twisting or jumping with symmetrical uniform resistance to flexing in all directions, even to the arc to approximate abutting relation for the wire of the helix. This rubber tube 8 has the wire 9 extend therealong in such proximity to opposite terminal taper fitting 10 (Fig. 4). Complementary taper fitting 11 having knurled rim 12 may have threads 13 between the nut fitting 12 and head portion 14 effective not only to clamp the flare terminus of the rubber hose 8 but therewith a terminal portion of the helix 9. Accordingly, this helix 9 is not only held at the clamp 7 but at this fitting 10, 12, and thereby anchors the hose positively as to this helix.

The head portion 14 provides seat 15 for rubber seat 16 anchored by screw 17 into guide stem 18 extending through perforate diaphragm or spider 19, thereby leaving annular series of openings 20 for liquid flow supplied under pressure from the hose 8. In practice, this pressure may run say forty to eighty pounds per square inch or even higher. From this head portion 14 extends flare 21 to annularly corrugated closure disk 22 having on the convex outer portions 23 of the corrugations delivery ends of cylindrical ports 24 as in annular series providing high pressure jets for the liquid from chamber 25 in the flare portion 21.

Transversely across this chamber 25 extends sleeve sections 26, 27, in alignment with each other and spaced to mount therebetween cam 28, having connection by key 29 to shaft 30 through these aligned sleeves 26, 27. Fixed to the termini of this shaft 30 by screws 31 is finger or digit-operable bail 32, which is in position for convenient rocking either by the thumb or finger from closed position adjacent the flare housing 21 to slightly open position, say for cloud effect, or in degrees therefrom to fully open position against the head portion 14, thereby so unseating the check valve 16 that the pressure volume of water is effective for impacting jet flow action. The bail 32 is normally in check valve closing position to seat against the head flare 21. However, to insure this direction of action as well as steady the valve in opening swinging of this bail 32, there is torsion spring 33 anchoring with the cam 28 and the sleeve 27 fixed with the flare 21. Centrally of this corrugated disk 22 is boss 34 which may engage seat 35 in opposing disk 36 having spray limiting shield or shroud 37 as drawing inwardly therefrom.

Screws 38 from this disk 36 engage the boss 34 not only in assembling this disk 36 with the head section having the disk 22 but in such assembly bringing ports 39 into alignment with the ports 24. These ports 39 have flare entrance portions 40 at the ridge portions of corrugations 41 in the disk 36 as toward the corrugated disk 22. There is thus provided air chamber regions between these oppositely concave groove portions as annular for the opposing disks. This housing flare 21 has clearance 42 as to the extension or shroud 37. Accordingly, there is annular air intake region for injection action of suction effected by the jets of liquid in flowing through the cylindrical ports 24. These condensed high pressure streams draw in the air from this clearance 42 and these oppositely concave grooves into the flare portions 40 for delivery into the impact-providing flow from the ports 39 clear of delivery opening 43 from the shroud 37. There is thus produced a low pressure air region in this shroud 37 by this self-aerating liquid pressure delivery tool.

With this bail 32 slightly lifted, hair 44 of the patient receiving the shampoo may be moistened to the slight degree desired for effective subsequent lathering or soaping or other cleansing treatment. As this massage or working of the cleansing substance or ingredient into the scalp may be effected, say by hand, such may be supplemented not only for the sudsing or lathering action but for the removal thereof according to the degree of impinging effect desired from the multi-jet tool as distinguished by more open position in the swinging of the bail and the desired spacing of the delivery outlet 43 from the hair. This manipulation is readily effected efficiently and rapidly for the initial setting of the valves 2, 4, for control of the temperature may not be disturbed notwithstanding, after the administration of the cloud of dampening, the tool may be dropped aside, and it will not leak because the check is automatically set and held.

As the attendant or operator desires further attention, it is only necessary to grasp the tool head and with the digit effect the desired opening and shifting, even into difficultly accessible regions about the head of the one undergoing treatment. In practice, the individual may be so disposed that the head may hang over or in proximity to a bowl to receive the hair and moisture. No matter which portion of the head of the individual is toward the bowl, this short range of flexing possible in the supply duct or hose 8 permits ready access without kinking or without hazard from rupture of the line or duct even though high pressure is used.

This pressure delivery of the impacting small cross-section streams into the scalp may initially be analogous to rubbing or massage action as further effective in these minute or shielded areas. Due to the liquid flow and air association sudsing or lathering is promoted for its effective action in degreasing or removing oil from the scalp regions as well as other impurities to the extent desired. As this volume of liquid is continued there is a rinsing or washing away of the soap and lather. According to the extent of treatment desired, there may be a resupply of the cleansing substance, say of the order of soap or other scalp treatment which may be for supplemental aeration and liquid course as well as rinsing to follow. These manipulations may be in rapid succession with the initially fixed temperature control as set by the valves 2, 4, or a desired departure therefrom, say even to a slightly cooling or refreshing final cleansing.

The extent of air supplied to the scalp, together with the liquid and the force thereof, has in practice been effective in so fluffing or loosening up the hair that final drying is attained with much greater expedition. The extent of the air as thus impacted or blown into the hair and about the scalp has, in addition to the comfort feeling of cleanliness, a refreshing effect, which response of the patient may be attributed not only to the air itself but to the aerated liquid as of a more pleasant reaction value as well as more effective in its cooperation for completing the shampoo. This air commingling with the definite temperature control means that the shampoo operator may effect with much less water a thorough lathering action, and likewise with reduced amount of water a more quick, fully effective, pleasant shampoo experience for the customer, with a saving of time to such extent that the number of persons treated may be doubled with the resulting treatments much more desirable than in hand manipulation method or with ordinary duct supply and rosette type of spray.

In operation, even at slight turning on of the pressure for dampening the ratio of the ports or openings is such that the inner basis openings 24 effect such a concentrated flow into the openings 39 that there is not spill at the annular clearance 42. With the tool held in upright position, say as the opening 43 is upward, this low rate of delivery may effect a filling of the chamber provided by the wall 37, and then will ooze over the sides to run down outside. As this pressure is increased, say to lift the water one-half inch or more above the opening 43 a few bubbles will seem to work through; and as this pressure is increased, the full charge of water in the region surrounded by the wall 37 is thrown out or evacuated. There is accordingly assurance from this mode of operation that with a delivery pressure in effective impacting, reduced pressure occurs in this shrouding wall as such is an aid in concentrating the delivery.

Furthermore, this shrouding or throat reduction has a tendency to reduce splattering or dispersion of the water away from the region sought. The general spherical contour is in a convenient shape for handling and giving a location for the mild action as close to the hair or scalp, while as withdrawn the inertia or the impact is seemingly more effective.

The aerated penetrating action from these impact jets is such an effective clearing action or rinsing that curds or objectionable residues as from soap or oil in the scalp are removed and this includes even alkali tendencies from the soap. There is thus enhanced the treating values to be had from subsequent handling of the scalp and hair. For instance, in the event of a dye or color treatment even to the henna action, this is effected in a uniform normal response throughout, for the hair and scalp are uniformly treated and cleansed by the shampoo tool as herein disclosed.

This rinsing or cleansing of the scalp is mechanically effective hereunder in the conduct of the shampoo with such a degree of thoroughness that even in difficult treatments occasion does not arise for attacking the objectionable conditions, say from hard water or extreme difficulties arising therefrom, as to which effort to avoid may be approached by acids such as vinegar, lemon or chemicals. This means that the desired high state of cleansing is mechanically effected in this shampoo without the chemical attacks, either basic or acid.

What is claimed and it is desired to secure by Letters Patent is:

1. A hand tool embodying a flexible liquid pressure supply duct terminating in a head, a multiple ported disk closure for the head, and an opposing disk with cone-shaped openings concentrating outlet flow from between the disks.

2. A hand tool embodying a flexible liquid pressure supply duct terminating in a head, a multiple ported disk closure for the head, an opposing disk with cone-shaped openings concentrating outlet flow from between the disks, and central mounting means assembling the disks with the ports aligned and providing annular clearance for air intake.

3. A hand tool embodying a flexible liquid pressure supply duct terminating in a head, a multiple ported disk closure for the head, an opposing disk with cone-shaped openings concentrating outlet flow from between the disks, central mounting means assembling the disks with the ports aligned and providing annular clearance for air intake, and a confining throat extension from the second disk clear of jet-impinging thereon.

4. A sprayer comprising a hollow casing, a multiple ported closure for one end of said casing, a member spaced from said closure and having a plurality of ports therethrough and in alignment with the ports in said closure, the diameter of the upper part of said ports in said member decreasing as the distance from said closure increases, the space between said closure and said member communicating with the atmosphere at places other than through said ports of said member.

5. A sprayer device comprising a head having a plurality of openings at one end thereof, a valve in said head, a cam for operating said valve, a digit actuable rockable bail for operating said cam, said bail carried by said head and including a saddle adapted to accommodate an actuating digit.

6. A spray device comprising a head having a plurality of ports at the discharge end thereof, means carried by said head and having a plurality of ports in substantial alignment with said first mentioned ports, said second mentioned ports being tapered downwardly and then substantially cylindrically, said means located below the discharge end of said head.

7. A spray device comprising a head, a head closure having a plurality of ports, the lower end of said ports being substantially cylindrical for directing liquid passing therethrough under pressure, means located below said closure and having a plurality of ports for receiving and directing the liquid from said first mentioned ports, said second mentioned ports tapered downwardly and then being substantially cylindrical, said first mentioned ports spaced from said second mentioned ports, the space therebetween communicating with the atmosphere, the size and location of said second mentioned ports with respect to said first mentioned ports being such that air is entrained in said liquid in the course of its passage through said second mentioned ports.

EARL L. ROCKWOOD.